United States Patent
Li et al.

(10) Patent No.: US 10,067,649 B2
(45) Date of Patent: Sep. 4, 2018

(54) PAGE SWITCHING METHOD AND APPARATUS

(71) Applicant: TENCENT TECHNOLOGY (SHENZHEN) COMPANY LIMITED, Shenzhen (CN)

(72) Inventors: Hui Li, Shenzhen (CN); Fengfeng Xu, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 468 days.

(21) Appl. No.: 14/708,630

(22) Filed: May 11, 2015

(65) Prior Publication Data
US 2015/0242077 A1    Aug. 27, 2015

Related U.S. Application Data

(63) Continuation of application No. PCT/CN2013/086219, filed on Oct. 30, 2013.

(30) Foreign Application Priority Data

Nov. 13, 2012    (CN) .......................... 2012 1 0454136

(51) Int. Cl.
*G06F 3/048*    (2013.01)
*G06F 3/0483*    (2013.01)
(Continued)

(52) U.S. Cl.
CPC .......... *G06F 3/0483* (2013.01); *G06F 3/0484* (2013.01); *G06F 3/0485* (2013.01); *G06F 3/0488* (2013.01); *G06F 3/04883* (2013.01)

(58) Field of Classification Search
CPC ..................................................... G06F 3/0483
See application file for complete search history.

(56) References Cited

U.S. PATENT DOCUMENTS 8,605,034 B1* 12/2013 Roy ....................... G06F 1/1694
345/156
2006/0059440 A1* 3/2006 Pry .................. G06F 17/30864
715/838
(Continued)

FOREIGN PATENT DOCUMENTS

CN    101078965 A    11/2007
CN    101414229 A    4/2009
(Continued)

OTHER PUBLICATIONS

Chinese Office Action for Application No. 2012104541360 dated Dec. 11, 2014, and an English concise explanation of relevance thereof.
(Continued)

*Primary Examiner* — Matthew Ell
(74) *Attorney, Agent, or Firm* — Harness, Dickey & Pierce, P.L.C.

(57) ABSTRACT

A page switching method and apparatus. The method includes receiving a sliding operation and obtaining a sliding direction and a sliding speed of the sliding operation. A position relation between a target page and a current page is determined according to the sliding direction. A number of sliding pages according to the sliding speed is obtained. An index of the current page is obtained and an index of the target page is obtained according to the position relation, the number of sliding pages, and the index of the current page; switching to the target page according to the index of the target page.

12 Claims, 3 Drawing Sheets

(51) Int. Cl.
*G06F 3/0488* (2013.01)
*G06F 3/0485* (2013.01)
*G06F 3/0484* (2013.01)

(56) References Cited

U.S. PATENT DOCUMENTS

2008/0155463 A1    6/2008  Lian et al.
2010/0235794 A1*   9/2010  Ording ................ G06F 3/0485
                                                        715/863

FOREIGN PATENT DOCUMENTS

| CN | 101566918 A | 10/2009 |
| CN | 102541433 A | 7/2012 |
| CN | 102646008 A | 8/2012 |

OTHER PUBLICATIONS

International Preliminary Report for International Application No. PCT/CN2013/086219 dated May 28, 2015.
International Search Report for Application No. PCT/CN2013/086219 dated Feb. 20, 2014.

* cited by examiner

PAGE SWITCHING METHOD AND APPARATUS

CROSS-REFERENCE TO RELATED APPLICATIONS

This application is a continuation of International Application No. PCT/CN2013/086219, filed Oct. 30, 2013. This application claims the benefit and priority of Chinese Application No. 201210454136.0, filed Nov. 13, 2012. The entire disclosures of each of the above applications are incorporated herein by reference.

FIELD

The present disclosure relates to a page switching method and apparatus.

BACKGROUND

This section provides background information related to the present disclosure which is not necessarily prior art.

There are multiple kinds of pages, such as web pages of browsers or menu pages displayed on terminal devices. Taking browsers as an example, general browsers support opening multiple web pages simultaneously. In order to achieve page switching, the multiple web pages are usually displayed through two kinds of methods, one method uses page title and address list and the other method uses page thumbnail collection.

When adopting page thumbnails for displaying and performing a right sliding operation on a page thumbnail display area, each thumbnail in the left side of the page thumbnail display area slides towards the middle and expands when doing so. A thumbnail in the middle will move towards the right side and is packed up. A thumbnail of a target page can be found through performing a left sliding operation or right sliding operation. However, when a distance between the target page and the current page is large, the thumbnail needs to perform multiple horizontally sliding operations before the target page can be found. The number of operations is large, resulting in low operation efficiency.

SUMMARY

This section provides a general summary of the disclosure, and is not a comprehensive disclosure of its full scope or all of its features.

The present disclosure describes a page switching method and apparatus, which improves operation efficiency.

A page switching method includes:
receiving a sliding operation, and obtaining a sliding direction and a sliding speed of the sliding operation;
determining a position relation between a target page and a current page according to the sliding direction;
obtaining a number of sliding pages according to the sliding speed;
obtaining an index of the current page, and obtaining an index of the target page according to the position relation between the target page and the current page, the number of sliding pages, and the index of the current page; and
switching to the target page according to the index of the target page.

A page switching apparatus includes:
a detection module configured to receive a sliding operation and obtain a sliding direction and a sliding speed of the sliding operation;
a determination module configured to determine a position relation between a target page and a current page according to the sliding direction;
a page number determining module configured to obtain a number of sliding pages according to the sliding speed;
a positioning module configured to obtain an index of the current page, and obtain an index of the target page according to the position relation between the target page and the current page, the number of sliding pages, and the index of the current page; and
a switching module configured to switch to the target page according to the index of the target page.

A computer-readable storage medium includes a set of instructions for performing a page switching method, the set of instructions to direct at least one processor to perform acts of:
obtaining a sliding direction and a sliding speed of a sliding operation;
obtaining a number of sliding pages according to the sliding speed;
obtaining an index of the current page, and obtaining an index of the target page according to the sliding direction, the number of sliding pages, and the index of the current page; and
switching to the target page according to the index of the target page.

In the above page switching method and apparatus, the number of sliding pages can be determined according to the sliding speed and an index of the target page can then be determined according to the number of sliding pages, the sliding direction, and the position relation between the target page and the current page. By using the sliding speed to determine the number of sliding pages, the sliding speed can be adjusted according to the distance between the target page and the current page; this helps to easily and quickly navigate to the target page, thereby improving operation efficiency.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes of selected embodiments and not all possible implementations, and are not intended to limit the scope of the present disclosure.

DETAILED DESCRIPTION

Various embodiments will now be described more fully with reference to the accompanying drawings.

For simplicity and illustrative purposes, the present disclosure is described by referring mainly to various embodiments thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to and the term "including" means including but not limited to. The term "based on" means based on at least in part.

Figure 1:
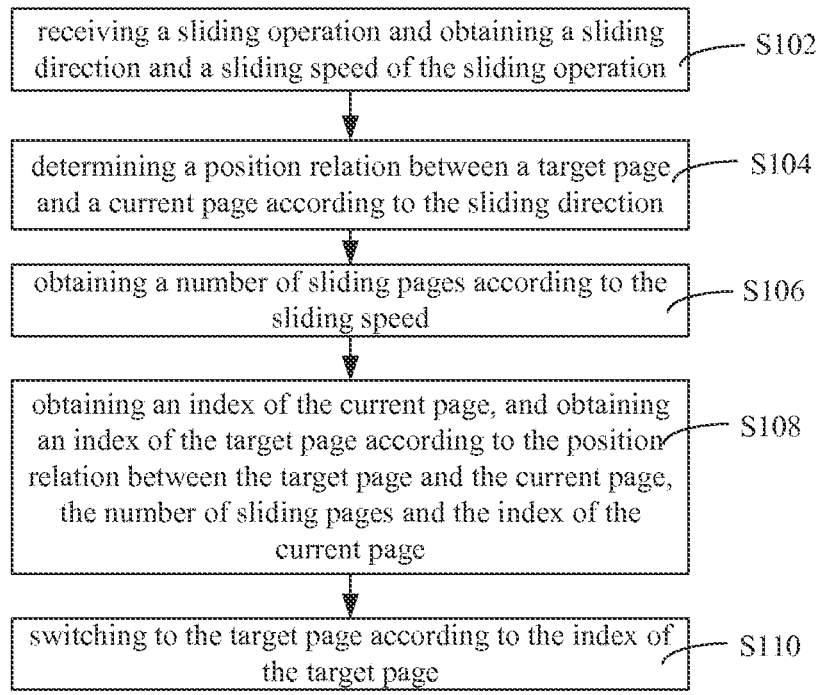
FIG. 1 is a flowchart of a page switching method according to various embodiments.

As shown in FIG. 1, according to various embodiments, a page switching method includes the following:

S102: Receiving a sliding operation and obtaining a sliding direction and a sliding speed of the sliding operation.

A sliding operation on a touch screen is received. If multiple pages of a browser are displayed in the form of page thumbnails, the sliding operation is performed on a page thumbnail display area. If application icons in a menu are divided and distributed into multiple pages according to categories, the sliding operation is performed on a touch screen area. If contacts are displayed in order of initial letters of names, for example, contacts whose names begin with the letter A are displayed in the first page, contacts whose names begin with the letter B are displayed in the second page, and, in a similar fashion, contacts whose names begin with the letter Z are displayed in the twenty-sixth page. When looking up one contact, a sliding operation can be performed on the touch screen to turn pages.

In a situation where multiple pages are opened in a browser, content of a current page is displayed and the additional pages are displayed in a preset area of a touch screen in the form of page thumbnails, is taken as an example for description. The touch screen can be, but is not limited to, a touch screen of a terminal device, such as a smart phone, a personal digital assistant, etc.

According to various embodiments, obtaining a sliding direction includes detecting a position relation between two consecutive sliding points during the sliding operation and determining the sliding direction according to the position relation between the two sliding points.

A screen of the touch screen can be divided into multiple points and each point corresponds to a coordinate. When performing the sliding operation on the touch screen, different points are touched sequentially. By detecting coordinates of the two consecutive sliding points during the sliding operation, the sliding direction can be determined according to the coordinates of the two sliding points.

Figure 2:
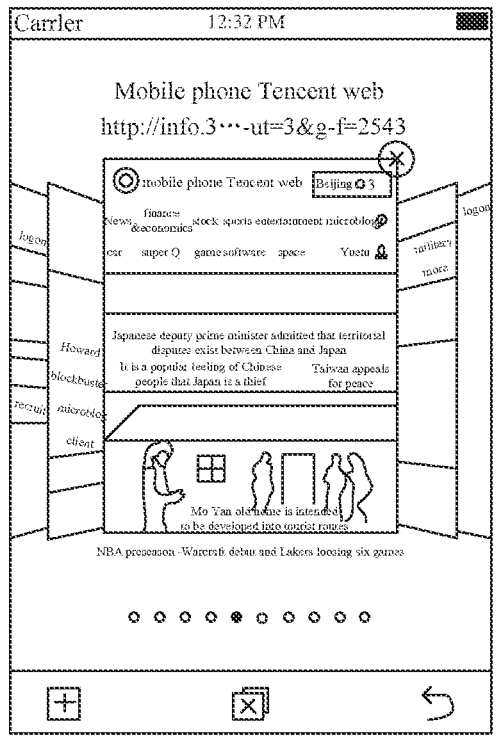
FIG. 2 is a drawing showing horizontally displaying multiple page thumbnails in a browser according to various embodiments.
Figure 3:
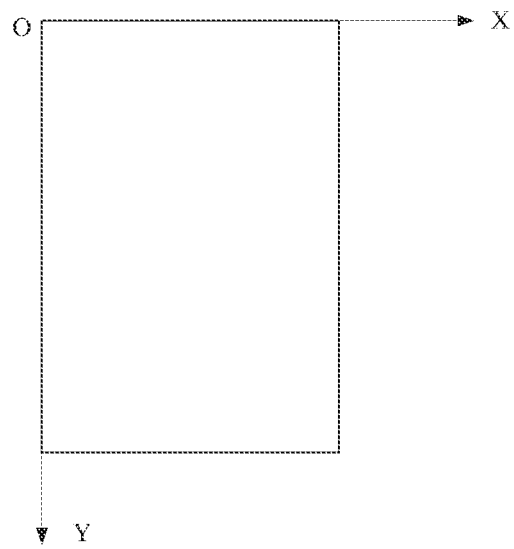
FIG. 3 is a diagram of an established coordinate system according to various embodiments.

Taking horizontally displaying page thumbnails as an example, as shown in FIG. 2, the sliding operation can include sliding left and right. As shown in FIG. 3, a left vertex of the touch screen is taken as an origin O, the horizontal extension is taken as an X-axis positive direction, and the vertical extension is taken as a Y-axis positive direction. Coordinates of detected consecutive two sliding points are P0 (x0, y0) and P1 (x1, y1), respectively. Since the page thumbnails are horizontally displayed, only the size of horizontal coordinates is considered. If x0<x1, the sliding direction is a first direction, i.e., sliding from left to right. If x0>x1, the sliding direction is a second direction, i.e., sliding from right to left.

Taking vertically displaying page thumbnails as an example, the sliding operation can include sliding up and down. Referring to FIG. 3, the coordinates of the detected two consecutive sliding points are P0 (x0, y0) and P1 (x1, y1), respectively. Since the page thumbnails are vertically displayed, size of vertical coordinates is considered. If y0<y1, the sliding direction is a first direction, i.e., sliding from up to down. If y0>y1, the sliding direction is a second direction, i.e., sliding from down to up.

According to various embodiments, obtaining a sliding speed includes detecting a distance and sliding time between the last two consecutive sliding points before the end of the sliding operation and processing the distance and the sliding time to obtain the sliding speed.

When performing the sliding operation on the touch screen, sliding strength can be reflected by the sliding speed. The sliding speed can be obtained through dividing the distance between the last two consecutive sliding points by the sliding time between the last two consecutive sliding points.

Taking horizontally displaying the page thumbnails as an example, the distance between the last two consecutive sliding points calculates changes of the sliding points on the horizontal coordinates. Similarly, when vertically displaying the page thumbnails, the distance between the last two consecutive sliding points calculates changes of the sliding points on the vertical coordinates. In calculating one coordinate change the calculation is simple and the processing efficiency is high.

S104: Determining a position relation between a target page and a current page according to the sliding direction.

If the sliding direction is the first direction, it means the position relation between the target page and the current page is where the target page is a previous page of the current page. If the sliding direction is the second direction, it means the position relation between the target page and the current page is where the target page is a latter page of the current page. The previous page means, after pages are numbered according to a display order, one page with a small number is a previous page of one page with a large number. Similarly, the latter page means that one page with a large number is a latter page of one page with a small number. For example, there are N page thumbnails numbered from 0 to N−1 according to the display order, then, one page numbered 5 is a previous page of the pages numbered from 6 to N−1, and the page numbered 6 is a latter page of pages numbered from 0 to 5.

Taking horizontally displaying the page thumbnails as an example, when the sliding direction is from left to right, the target page is in the left side of the current page. When the sliding direction is from right to left, the target page is in the right side of the current page.

S106: Obtaining a number of sliding pages according to the sliding speed.

A sliding parameter can be set in advance. The sliding parameter can be obtained according to statistics of multiple sliding operation tests. A ratio between the sliding speed and the sliding parameter is obtained and taken as the number of sliding pages.

S108: Obtaining an index of the current page and obtaining an index of the target page according to the position relation between the target page and the current page, the number of sliding pages, and the index of the current page.

According to various embodiments, there are N horizontally displayed page thumbnails whose indexes are from 0 to N−1 in sequence. An index of the current page thumbnail is represented as currentIndex, an index of the target page thumbnail is represented as targetIndex, and the number of sliding obtained via calculation according to the sliding speed is represented as X.

When the sliding direction is the first direction, i.e., sliding from left to right, targetIndex=currentIndex−X. When the sliding direction is the second direction, i.e., sliding from right to left, targetIndex=currentIndex+X.

In order to prevent the targetIndex from exceeding the range of [0, N−1], the index of the target page can be corrected. That is, if a value of the obtained targetIndex is less than 0, then the targetIndex is 0. If a value of the obtained targetIndex is greater than N−1, then the targetIndex is N−1.

S110: Switching to the target page according to the index of the target page.

For multiple pages of the browser, after the index of the target page is found, sliding in animation mode the thumbnail of the target page to a center of the screen.

For contact information being displayed in multiple pages, after the index of the target page is found, sliding the target page and displaying contact information of the target page.

In the above page switching method, the number of sliding pages can be determined according to the sliding speed and an index of the target page can then be determined according to the number of sliding pages, the sliding direction, and the position relation between the target page and the current page. By using the sliding speed to determine the number of sliding pages, the sliding speed can be adjusted according to the distance between the target page and the current page. This helps to easily and quickly navigate to the target page, thereby improving operation efficiency.

Figure 4:
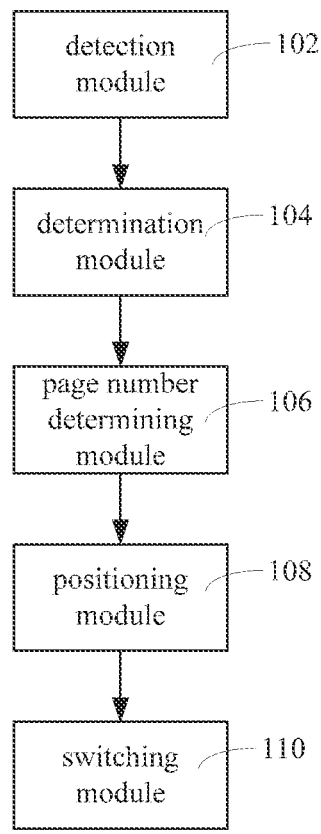
FIG. 4 is an internal structure diagram of a page switching apparatus according to various embodiments.

As shown in FIG. 4, according to various embodiments, a page switching apparatus includes a detection module 102, a determination module 104, a page number determining module 106, a positioning module 108, and a switching module 110.

The detection module 102 is configured to receive a sliding operation and obtain a sliding direction and a sliding speed of the sliding operation. Specifically, a sliding operation on a touch screen is received. If multiple pages of a browser are displayed in the form of page thumbnails, the sliding operation is performed on a page thumbnail display area. If application icons in a menu are divided and distributed into multiple pages according to categories, the sliding operation is performed on a touch screen area. If contacts are displayed in order of initial letters of names, for example, contacts whose names begin with the letter A are displayed in the first page, contacts whose names begin with the letter B are displayed in the second page, in a similar fashion, contacts whose names begin with the letter Z are displayed in the twenty-sixth page, when looking up one contact, a sliding operation can be performed on the touch screen to turn pages. This situation where multiple pages are opened in a browser, content of a current page is displayed, and the additional pages are displayed in a preset area of a touch screen in the form of page thumbnails, is taken as an example for description.

According to various embodiments, the detection module 102 is further configured to detect a position relation between two consecutive sliding points during the sliding operation and determine the sliding direction according to the position relation between the two sliding points.

Specifically, a screen of the touch screen can be divided into multiple points and each point corresponds to a coordinate. When performing the sliding operation on the touch screen, different points are touched sequentially. The detection module 102 detects coordinates of the consecutive two sliding points during the sliding operation and determines the sliding direction according to the coordinates of the two sliding points.

Taking horizontally displaying page thumbnails as an example, as shown in FIG. 2, the sliding operation can include sliding left and right. As shown in FIG. 3, a left vertex of the touch screen is taken as an origin, the horizontal extension is taken as an X-axis positive direction, and the vertical extension is taken as a Y-axis positive direction. Coordinates of the detected two consecutive sliding points are P0 (x0, y0) and P1 (x1, y1), respectively. Since the page thumbnails are horizontally displayed, the size of horizontal coordinates is considered. If x0<x1, the sliding direction is a first direction, i.e., sliding from left to right. If x0>x1, the sliding direction is a second direction, i.e., sliding from right to left.

Taking vertically displaying page thumbnails as an example, the sliding operation can include sliding up and down. Referring to FIG. 3, the coordinates of the detected two consecutive sliding points are P0 (x0, y0) and P1 (x1, y1), respectively. Since the page thumbnails are vertically displayed, the size of vertical coordinates is considered. If y0<y1, the sliding direction is a first direction, i.e., sliding from up to down. If y0>y1, the sliding direction is a second direction, i.e., sliding from down to up.

According to various embodiments, the detection module 102 detects a distance and sliding time between the last two consecutive sliding points before the end of the sliding operation and processes the distance and the sliding time to obtain the sliding speed.

Specifically, when performing the sliding operation on the touch screen, sliding strength can be reflected by the sliding speed. The sliding speed can be obtained through dividing the distance between the last two consecutive sliding points by the sliding time between the last two consecutive sliding points.

Taking horizontally displaying the page thumbnails as an example, the distance between the last two consecutive sliding points calculates changes of the sliding points on the horizontal coordinates. Similarly, when vertically displaying the page thumbnails, the distance between the last two consecutive sliding points calculates changes of the sliding points on the vertical coordinates. In calculating one coordinate change, the calculation is simple and the processing efficiency is high.

The determination module 104 is configured to determine a position relation between a target page and a current page according to the sliding direction.

Specifically, if the sliding direction is the first direction, the position relation between the target page and the current page is where the target page is a previous page of the current page. If the sliding direction is the second direction, the position relation between the target page and the current page is where the target page is a latter page of the current page. In the previous page, after pages are numbered according to a display order, one page with a small number is a previous page of one page with a large number. Similarly, the latter page means that one page with a large number is a latter page of one page with a small number. For example, there are N page thumbnails numbered from 0 to N−1 according to the display order, then, one page numbered 5 is a previous page of pages numbered from 6 to N−1 and the page numbered 6 is a latter page of pages numbered from 0 to 5.

Taking horizontally displaying the page thumbnails as an example, when the sliding direction is from left to right, the target page is in the left side of the current page. When the sliding direction is from right to left, the target page is in the right side of the current page.

The page number determining module 106 is configured to obtain a number of sliding pages according to the sliding speed.

The positioning module 108 is configured to obtain an index of the current page and obtain an index of the target page according to the position relation between the target page and the current page, the number of sliding pages, and the index of the current page.

According to various embodiments, there are N horizontally displayed page thumbnails whose indexes are from 0 to N−1 in sequence. An index of the current page thumbnail is represented as currentIndex, an index of the target page thumbnail is represented as targetIndex, and the number of sliding obtained via calculation according to the sliding speed is represented as X.

When the sliding direction is the first direction, i.e., sliding from left to right, targetIndex=currentIndex−X. When the sliding direction is the second direction, i.e., sliding from right to left, targetIndex=currentIndex+X.

The switching module 110 is configured to switch to the target page according to the index of the target page. Specifically, for multiple pages of the browser, after the index of the target page is found, the switching module 110 slides in animation mode the thumbnail of the target page to a center of the screen.

For contact information being displayed in multiple pages, after the index of the target page is found, sliding the target page and displaying contact information of the target page.

In the above page switching apparatus, the number of sliding pages can be determined according to the sliding speed and an index of the target page can then be determined according to the number of sliding pages, the sliding direction, and the position relation between the target page and the current page. By using the sliding speed to determine the number of sliding pages, the sliding speed can be adjusted according to the distance between the target page and the current page. This helps to easily and quickly navigate to the target page, thereby improving operation efficiency.

Figure 5:
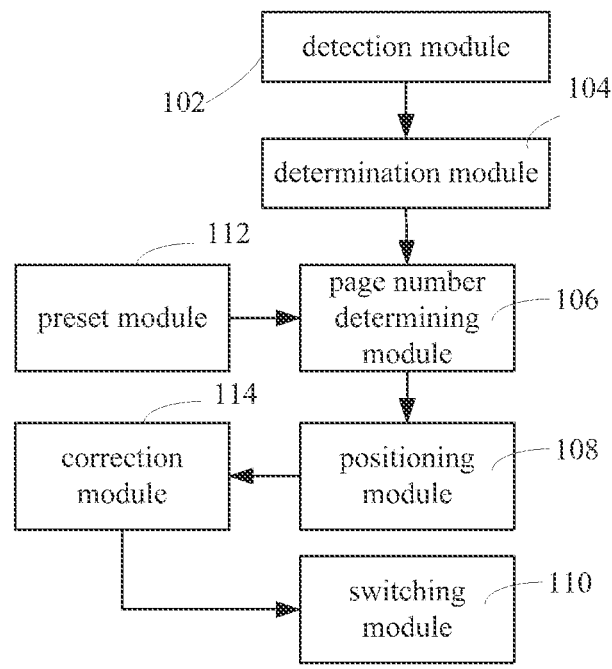
FIG. 5 is an internal structure diagram of a page switching apparatus according to various embodiments.

As shown in FIG. 5, according to various embodiments, the above page switching apparatus further includes a preset module 112 and a correction module 114. The preset module 112 is configured to set a sliding parameter in advance. Specifically, the sliding parameter can be obtained according to statistics of multiple sliding operation tests. The page number determining module 106 is further configured to obtain a ratio between the sliding speed and the sliding parameter and take the ratio as the number of sliding pages. The correction module 114 is configured to correct the index of the target page. In order to prevent the targetIndex from exceeding the range of [0, N−1], the correction module 114 corrects the index of the target page. That is, if a value of the obtained targetIndex is less than 0, then the targetIndex is 0; if a value of the obtained targetIndex is greater than N−1, then the targetIndex is N−1.

Figure 6:
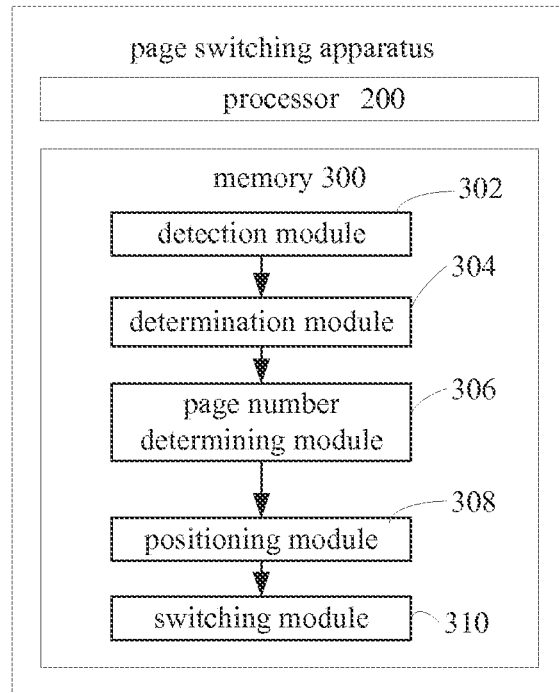
FIG. 6 is a diagram illustrating a structure of a page switching apparatus according to various embodiments.

FIG. 6 is a diagram illustrating an example structure of a page switching apparatus according to various embodiments.

As shown in FIG. 6, the apparatus includes a CPU 200 and a memory 300. The CPU 200 and the memory 300 are connected with each other via an internal bus. The memory 300 stores modules of machine readable instructions executable by the CPU 20, including a page switching apparatus which includes a detection module 302, a determination module 304, a page number determining module 306, a positioning module 30,8 and a switching module 310. Functions of the detection module 302, the determination module 304, the page number determining module 306, the positioning module 30,8 and the switching module 310 are similar with the functions of the detection module 102, the determination module 104, the page number determining module 106, the positioning module 108, and the switching module 110. The functions may be implemented with the assistance of other modules and may involve cooperation of multiple modules, e.g., may utilize processing functions of the CPU 200, may relay on the internal bus for data transmission, etc.

The methods, modules and apparatus described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers, and so on.

A machine-readable storage medium is also provided to store instructions to cause a machine to execute a process as described according to various embodiments. Specifically, a system or apparatus having a storage medium that stores machine-readable program codes for implementing functions of any of the above examples and that may cause the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM, and so on. The program code may be downloaded from a server computer via a communication network.

It should be noted that, alternatively to the program codes being executed by a computer, at least part of the operations performed by the program codes may be implemented by an operation system running in a computer following instructions based on the program codes to implement any of the above examples.

In addition, the program codes implemented from a storage medium are written in storage in an extension board inserted in the computer or in storage in an extension unit connected to the computer. In this example, a CPU in the extension board or the extension unit executes at least part of the operations according to the instructions based on the program codes to implement any of the above examples.

Although described specifically throughout the entirety of the present disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims—and their equivalents—in which all terms are meant in their broadest reasonable sense unless otherwise indicated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A page switching method comprising:
    displaying thumbnails of a plurality of web pages in an interface of a web browser, a thumbnail of a current web page is displayed at a center of the interface;
    receiving a sliding operation, and obtaining a sliding direction and a sliding speed of the sliding operation;
    determining a position relation between a target web page and a current web page according to the sliding direction;
    obtaining a number of sliding thumbnails of web pages according to the sliding speed;
    obtaining an index of the current web page, and obtaining an index of the target web page according to the position relation between the target web page and the current web page, the number of sliding thumbnails of web pages, and the index of the current web page; and
    switching a thumbnail displayed at the center of the interface from the thumbnail of the current web page to the thumbnail of the target web page identified by the index of the target web page;
    wherein before receiving the sliding operation, and obtaining the sliding direction and the sliding speed of the sliding operation;
    setting a sliding parameter in advance;
    wherein obtaining the number of sliding thumbnails of web pages according to the sliding speed includes obtaining a ratio between the sliding speed and the sliding parameter and taking the ratio as the number of sliding thumbnails of web pages.

2. The method of claim 1, wherein the obtaining a sliding direction comprises:
    detecting a position relation between consecutive two sliding points during the sliding operation, and determining the sliding direction according to the position relation between the two sliding points.

3. The method of claim 1, wherein the obtaining a sliding speed comprises:
    detecting a distance and sliding time between last two consecutive sliding points before an end of the sliding operation, and processing the distance and the sliding time to obtain the sliding speed.

4. The method of claim 1, wherein the determining a position relation between a target web page and a current web page according to the sliding direction comprises:
    if the sliding direction is a first direction, the position relation between the target web page and the current web page is that the target web page is a previous web page of the current web page; and
    if the sliding direction is a second direction, the position relation between the target web page and the current web page is that the target web page is a latter web page of the current web page.

5. The method of claim 1, wherein after the obtaining an index of the current web page, and obtaining an index of the target web page according to the position relation between the target web page and the current web page, the number of sliding thumbnails of web pages and the index of the current web page, the method further comprises:
    correcting the index of the target web page to be one of indices of the web pages opened in the web browser.

6. A page switching apparatus comprising: a processor and a memory storing computer-readable instructions executable by the processor to:
    set a sliding parameter in advance;
    display thumbnails of a plurality of web pages in an interface of a web browser, a thumbnail of a current web page is displayed at a center of the interface;
    receive a sliding operation and obtain a sliding direction and a sliding speed of the sliding operation;
    determine a position relation between a target web page and a current web page according to the sliding direction;
    obtain a ratio between the sliding speed and the sliding parameter and take the ratio as a number of sliding thumbnails of web pages according to the sliding speed;
    obtain an index of the current web page, and obtain an index of the target web page according to the position relation between the target web page and the current web page, the number of sliding thumbnails of web pages and the index of the current web page; and
    switch a thumbnail displayed at the center of the interface from the thumbnail of the current web page to the thumbnail of the target web page identified by the index of the target web page.

7. The apparatus of claim 6, wherein the instructions are executable by the processor to: detect a position relation between consecutive two sliding points during the sliding operation, and determine the sliding direction according to the position relation between the two sliding points.

8. The apparatus of claim 6, wherein the instructions are executable by the processor to: detect a distance and sliding time between last two consecutive sliding points before an end of the sliding operation, and process the distance and the sliding time to obtain the sliding speed.

9. The apparatus of claim 6, wherein if the sliding direction is a first direction, the position relation between the target web page and the current web page is that the target web page is a previous web page of the current web page; and if the sliding direction is a second direction, the position relation between the target web page and the current web page is that the target web page is a latter web page of the current web page.

10. The apparatus of claim 6, wherein the instructions are executable by the processor to:

correct the index of the target web page to be one of indices of the web pages opened in the web browser.

11. A non-transitory computer-readable storage medium comprising a set of instructions for performing a page switching method, the set of instructions to direct at least one processor to perform acts of:

setting a sliding parameter in advance;

displaying thumbnails of a plurality of web pages in an interface of a web browser, a thumbnail of a current web page is displayed at a center of the interface;

obtaining a sliding direction and a sliding speed of a sliding operation;

obtaining a ratio between the sliding speed and the sliding parameter and taking the ratio as a number of sliding thumbnails of web pages according to the sliding speed;

obtaining an index of the current web page, and obtaining an index of a target web page according to the sliding direction, the number of sliding thumbnails of web pages and the index of the current web page; and switching a thumbnail displayed at the center of the interface from the thumbnail of the current web page to the thumbnail of the target web page identified by the index of the target web page.

12. The non-transitory computer-readable storage medium of claim 11, wherein if the sliding direction is a first direction, the index of the target web page is equal to the index of the current web page minus the number of sliding thumbnail of the web pages; and if the sliding direction is a second direction, the index of the target web page is equal to the index of the current web page plus the number of sliding thumbnail of the web pages.

\* \* \* \* \*